D. DRINGMAN.
NUT LOCK.
APPLICATION FILED OCT. 11, 1919.

1,371,742. Patented Mar. 15, 1921.

INVENTOR:
Daniel Dringman.
by
Lacey & Lacey, Attys.

UNITED STATES PATENT OFFICE.

DANIEL DRINGMAN, OF PORTLAND, OREGON.

NUT-LOCK.

1,371,742.

Specification of Letters Patent.   Patented Mar. 15, 1921.

Application filed October 11, 1919.  Serial No. 329,917.

*To all whom it may concern:*

Be it known that I, DANIEL DRINGMAN, a citizen of the United States, residing at Portland, in the county of Multnomah and State of Oregon, have invented certain new and useful Improvements in Nut-Locks, of which the following is a specification.

This invention relates to improvements in a combined lock washer and nut having novel means for detachably securing the nut on a bolt.

An important object of this invention is to provide a lock washer having a pair of upstanding arcuate locking sections adapted to be arranged between a portion of the nut and the bolt for securely binding the nut on the bolt.

A further object of this invention is to provide a lock washer having a pair of downturned locking tongues adapted to engage the work for rigidly securing the washer in position.

A further object of the invention is to provide a combined lock washer and nut of the class described which is simple to apply, of highly simplified construction and cheap to manufacture.

Other objects and advantages of the invention will be apparent during the course of the following description.

Figure 1:
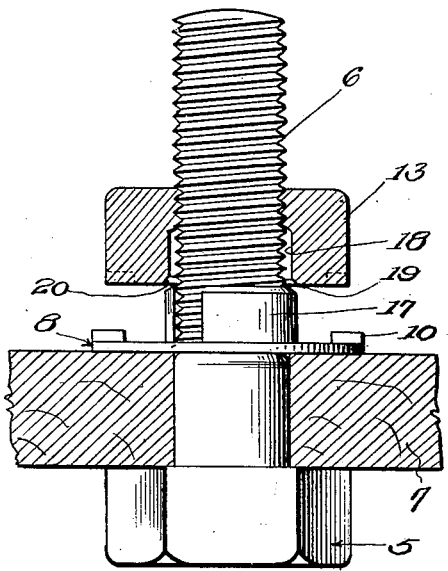
Figure 3:
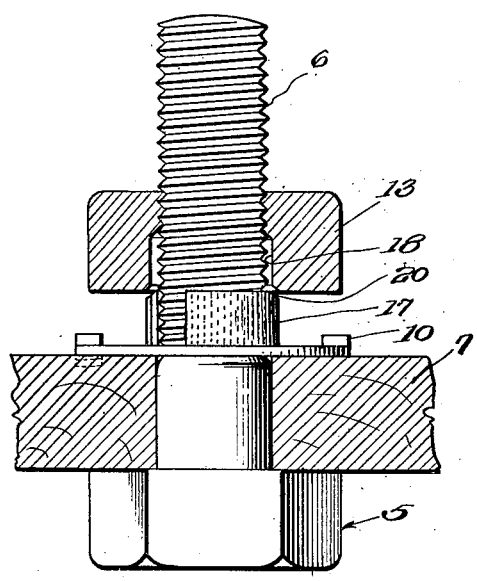
Figure 2:
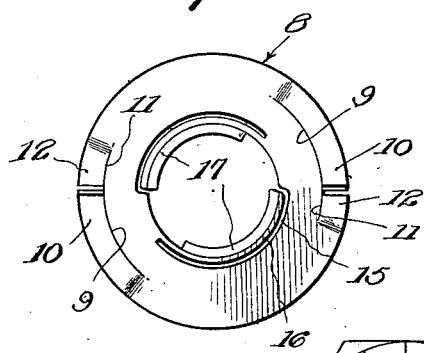
Figure 4:
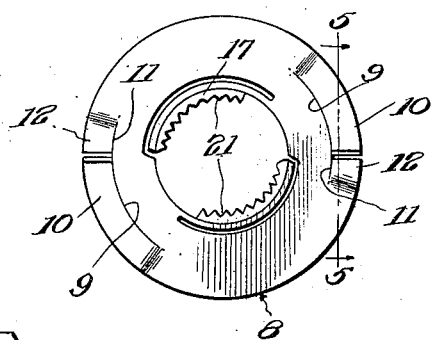
Figure 5:
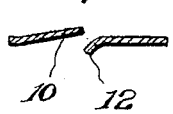
Figure 6:
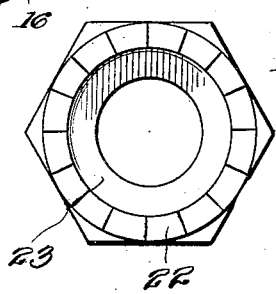

In the accompanying drawing forming a part of this application and in which like numerals are employed to designate like parts throughout the same, Figure 1 is a view of the combined lock washer and nut applied, the nut being shown in section, Fig. 2 is a plan view of the washer, Fig. 3 is a view in elevation of a modified form of washer applied, Fig. 4 is a plan view of a modified form of washer, Fig. 5 is a transverse section taken on line 5—5 of Fig. 4, Fig. 6 is a plan view of a modified form of nut.

In the drawing wherein for the purpose of illustration is shown several preferred embodiments of the invention, the numeral 5 generally designates a bolt having a screw threaded shank 6 extended through a piece of work 7.

A lock washer 8 clearly illustrated in Fig. 2 is adapted to be mounted upon the shank 6 and is provided with a pair of concentric incisions 9 which form a pair of arcuate locking tongues 10. A second pair of relatively short concentric incisions 11 are provided in the edge portion of the washer and form a pair of diametrically opposed relatively short work engaging or anchoring tongues 12. The arcuate or segmental anchoring tongues 12 extend in the opposite direction of rotation of a nut 13 and are adapted to rigidly secure the nut in position. When the nut 13 is threaded on the shank, the under side of the same engages the upwardly extending tongues 10 and is thereby locked against accidental rotation. With reference to Fig. 1, it will be noted that the edge portion of the washer and the outer edge portions of the tongues 10 extend beyond the outer sides of the nut 13 so that the forward end of a socket wrench may be engaged with the outer edges of the tongues 10 for pressing the same downwardly out of contact with the nut 13 when it is desired to remove the nut.

As clearly illustrated in Fig. 2, the inner edge portion of the annular washer 8 is provided with a pair of diametrically opposed concentrically arranged slots 15 which form a pair of spring tongues 16. The end portions of the spring tongues 16 are formed integral with upstanding arcuate binding plates 17 arranged on opposite sides of the shank 6 and adapted to be tightly engaged with the same for locking the washer to the shank. The spring tongues 16 permit the arcuate locking plates 17 to be freely drawn into engagement with the shank 6 without the possibility of straining the washer. The binding plates 17 are formed integral with the body of the washer and are stamped from the same piece of material as the washer whereby the washer may be economically produced.

The bore of the nut has its lower portion enlarged as indicated at 18 and is adapted for the reception of the binding plates 17. The upper edges of the binding plates are beveled as indicated at 19 as is the adjacent face 20 of the nut whereby the binding plates are drawn tightly into engagement with opposite sides of the bolt when the nut is applied. When the nut is screwed down to the limit of its movement, the arcuate members 17 tightly engage opposite sides of the bolt and thereby lock the washer securely in position.

In the form of the invention illustrated in Fig. 3, the inner sides of the arcuate members 17 are provided with vertical teeth 21 adapted to be engaged with the threads of the shank for securely connecting the washer to the bolt. As in the form of the invention illustrated in Fig. 1, the washer and the tongues 10 extend beyond the outer sides of the nut 13 whereby the forward end of the socket wrench may be engaged with the tongues 10 for releasing the same from contact with the nut.

In the form of the invention illustrated in Fig. 6, the lower face of the nut may be provided with an annular series of teeth 22 adapted for engaging the forward ends of the tongues 10 when the nut is applied. The annular series of teeth 22 are arranged along the outer edge portion of the face of the nut for leaving the inner portion 23 smooth.

In the practice of the invention, the washer is arranged upon the shank after the bolt has been passed through the work and the nut is subsequently applied to the bolt. In threading the nut on the bolt, the same is engaged with the arcuate locking plates 17 and causes the same to be drawn into rigid contact with the threads of the bolt. Upon a further threading of the nut on the bolt, the same is drawn into engagement with the tongues 10 whereby accidental loosening of the nut is prevented. The relatively short tongues 12 bite into the work and serve to anchor the lock washer in position. When it is desired to remove the nut, a socket or other wrench is arranged over the nut and engaged with the tongues 10 for releasing the same from locking engagement with the nut. Upon rotating the nut in an anticlockwise direction the same is drawn out of contact with the arcuate locking plates 17 and the arcuate locking plates are in turn released from engagement with the screw threads on the shank. When the nut illustrated in Fig. 6 is employed, the annular series of teeth on the same engage the forward ends of the tongues 10 and assist in securing the nut in an adjusted position.

It will be noted, especially upon reference to Figs. 2 and 4, that the binding plates are spaced apart at both ends and that the device embodies two independent binding plates disposed diametrically opposite each other and carried throughout their circular or annular extent each by a spring tongue. As a result of this construction, the entire body of each binding plate is compressible about and against the shank of the bolt and there is an unmutilated portion of the washer at diametrically opposite points of the same between the binding plates and alined with the clear spaces separating the same, so that compressing of the binding plates about the shank of the bolt does not impose any distorting strain on the main body of the washer but the entire strain is borne by the spring tongues from which the respective binding plates extend. Consequently, there is no additional strain put upon those portions of the washer which are intended to engage the part to be held and the nut for the purpose of preventing rotation and loosening of the washer.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. The combination with a bolt, of a washer fitting concentrically on the bolt and having a pair of diametrically opposed arcuate slots adjacent its central opening thereby defining a pair of spring tongues, arcuate binding plates extending from said tongues and having their inner sides provided with teeth, the outer edge portion of said washer being provided with pairs of upwardly and downwardly extending locking tongues to engage a nut and the part to be held respectively, and a nut having a portion of its bore enlarged to receive said binding plates and clamp the same around the bolt with the teeth of the binding plates engaging the bolt.

2. The combination with a bolt, of a washer encircling the bolt and provided with means for engaging a nut and a part to be secured, the washer having diametrically opposed arcuate slots adjacent its inner edge whereby to define spring tongues, binding plates extending laterally one from each of said spring tongues with both longitudinal edges of the plate within the limits of the tongue, and a nut fitted on the bolt to be turned home against the washer and having one end of its bore enlarged whereby to receive said binding plates and compress them into clamping engagement with the bolt.

In testimony whereof I affix my signature.

DANIEL DRINGMAN. [L. S.]